United States Patent [19]
Nagano et al.

[11] 3,852,476
[45] Dec. 3, 1974

[54] PROCESS FOR STERILIZING FOODSTUFFS AND BEVERAGES

[76] Inventors: Yuji Nagano, 9-13, 3-Chome, Tsurukawa, Machida-shi; Iwao Sato, 15-51, 3 Chome, Asahi-machi, Machida-shi, both of Tokyo, Japan

[22] Filed: July 27, 1973

[21] Appl. No.: 383,433

[30] Foreign Application Priority Data
July 27, 1972  Japan.............................. 47-74628

[52] U.S. Cl........................................... 426/7, 21/2
[51] Int. Cl.............................................. A23l 3/34
[58] Field of Search ........... 426/7, 52, 63; 195/125, 195/8, 96; 21/58, 2

[56] References Cited
UNITED STATES PATENTS
3,672,957   6/1972   Scharpf................................ 195/96

OTHER PUBLICATIONS

Chemical Abstracts, Vol 72, 1970, 52114w, Spores, Gould et al., (1968) 4, 276–286.

Primary Examiner—Raymond N. Jones
Assistant Examiner—Esther L. Massung
Attorney, Agent, or Firm—Wolder & Gross

[57] ABSTRACT

This invention relates to a process for sterilizing foodstuffs and beverages contaminated with spore-bearing microorganisms by adding thereto an enzyme selected from the group consisting of cellulase and lysozyme and thereafter heating the foodstuff or beverage to effect relatively low temperature sterilization.

5 Claims, No Drawings

PROCESS FOR STERILIZING FOODSTUFFS AND BEVERAGES

BACKGROUND OF THE INVENTION

In general, sterilization by heating is most commonly applied for preparation of foodstuffs and beverages to be stored for a long period of time. For example, in heat sterilization of canned foodstuffs or beverages, putrefying microorganisms are completely sterilized by heating at a high temperature, e.g., 120°C. The sterilized foodstuff or beverage can then be stored for a long period of time. However, due to heating at such high temperatures the taste and qualities of the foodstuff or beverage may deteriorate.

On the other hand, heat sterilization at a relatively low temperature, e.g., 70°-90°C has been applied to sterilization of pouched foodstuffs and beverages. In such low temperature sterilization, the freshness of the foodstuff and beverage is retained over an extended period of time. However, because putrefying microorganisms are not completely sterilized, the foodstuff and beverage cannot be stored for a long period of time. Putrefying microorganisms which remains alive after heating at a low temperature are spore-bearing microorganisms.

It is known that heat resistance or spore-bearing microorganism before germination is higher than that after germination. In order to completely sterilize the microorganism before germination, it is necessary to heat the microorganism at a high temperature. However, as described hereinbefore, the taste and quality of foodstuffs and beverages which are heated at a high temperature deteriorate.

DETAILED DESCRIPTION OF THE INVENTION

It has now been discovered that the improved sterilization of foodstuffs and beverages contaminated with spore-bearing microorganisms can be achieved by adding to the foodstuff or beverage (1) an enzyme capable of accelerating the germination of said microorganism, or (2) an enzyme capable of injuring the spores of said microorganism so as to reduce its heat resistance and thereafter heating the foodstuff or beverage.

The foodstuff or beverage can then be sterilized at relatively lower temperatures, e.g., less than 100°C., preferably 75°-95°C and sterilization of the foodstuff and beverage without loss of quality, taste or deterioration of freshness is thereby realized. Typical sterilization periods, such as 10 to 60 minutes, preferably 10 to 20 minutes are used.

As the enzyme capable of accelerating the germination of spore-bearing microorganism, cellulase may be used for the purpose of the present invention. The cellulase may be in the form of an enzyme preparate further containing a small amount of glucanase, xylanase, pectinase, dextranase, amylase, protease and substances having mascerating activity for practical use.

It was confirmed that when a spore-bearing microorganism contacts cellulase, the spores of the microorganism germinate rapidly and consequently the microorganism loses its heat resistance. This phenomenon is due to the germination of spores by the enzymatic action according to the present invention.

As the enzyme capable of injuring the spores of spore-bearing microorganism, for example, lysozyme (which is present in animal sources such as egg white) may be used. When spore-bearing microorganism contacts lysozyme before germination, its heat resistance (which can be determined, e.g. by D-value, the time required to destroy 90% of the organism — see "Modern Food Microbiology," by J. M. Jay, pages 158, 195) significantly reduces, and subsequent heat sterilization can be easily effected at a lower temperature. The reduction of heat resistance is caused by the partial injury of the spore walls by the enzymatic action but the spore is not yet killed.

According to the process of the present invention, heat sterilization at a low temperature is effected by either accelerating the germination of spore-bearing microorganism or injuring the spore walls of the microorganism whereby heat resistance of the microorganism is reduced. Both the germination and injury of spores occur even when the treatment of enzymes are carried out in water or a buffer solution without nutrients. The enzymatic reaction easily proceeds in foodstuff or beverage containing nutrients.

The treatment with enzyme according to the present invention is usually carried out at a temperature of from 35°C to 55°C at a pH of from 3.5 to 8.0. Normally, the amount of enzyme will be 0.05% to 10% preferably 0.1% to 0.5% based on weight of foodstuff. Typical treatment are 30 minutes to 120 minutes preferably 60 to 90 minutes. However, the conditions for the enzymatic treatment such as pH, temperature, concentration of enzyme, etc., vary, depending upon the foodstuff or beverage to be treated, putrefying microorganism and the enzyme in use. It is therefore necessary to select suitable conditions to the foodstuff or beverage to be treated.

The following examples 1 and 2 exemplify the sterilization effect on the enzymes on some typical spore-bearing microorganisms.

All ATCC members refer to microorganisms on deposit with the American Type Culture Collection and are fully available to the public.

Example 1

Spores of *Bacillus subtilis* ATCC 6633 were suspended in a phosphate buffer solution which was then subjected to filtration to prepare a spore suspension containing $10^6$ spores per ml. 10 ml. of 0.5% solution of Driselase (trade name for a microbiological enzyme composition consisting of cellulase, glucanase, xylanase, pectinase, dextranase, amylase, protease and substances having macerating activity, available from Kyowa Hakko Kogyo Kabushiki Kaisha, Japan) was added to the spore suspension (20 ml.) obtained. Thereafter, the enzymatic reaction was effected at 37°C for 60 minutes.

The germinating rate of the spores in the reaction mixture was determined periodically by microscopic observation using the methylene blue staining method. The results obtained are shown in the following table, from which it is confirmed that about 99% of all spores germinated for 60 minutes. Each reaction mixture periodically determined was heated at 95°C for 10 minutes and then the number of the living cells in the reaction mixture was counted. As apparent from the table, the greater the increase of germinating rate, the greater the decrease of the living cells after heating. After treatment, with enzyme for 60 minutes, sterilization is effected at 95°C for 10 minutes.

TABLE A

| Time of enzyme treatment (min.) | Germinating rate (%) | Number of living cells (cells ml. after heating) |
|---|---|---|
| 0 | 0 | $5.4 \times 10^3$ |
| 10 | 18 | $3.2 \times 10^3$ |
| 30 | 68 | $2.8 \times 10^2$ |
| 60 | 99 | 0 |
| 90 | 99 | 0 |

In the case of the spores of *Bacillus subtilis* which are resistant to heat, it is normally necessary to heat the spores at 120°C for 20 minutes for sterilization. However, since according to the present invention the spores germinate and consequently lose their resistance to heat when treated with Driselase, sterilization may now be effected at 95°C for 10 minutes. Such sterilization conditions, i.e., 95°C, help preserve the quality and freshness of the foodstuff or beverage.

Example 2

Spores of *Clostridium thermosaccharolyticum* were suspended in an ordinary medium having a pH of 7.0 and containing yeast extract (2.5 g) polypeptone (5.0g) and glucose (1.0 g) per liter of medium. Egg white lysozyme was added to the medium in a concentration of up to 0.05% by weight of the medium. After this, the mixture was subjected to reaction at 37°C for 60 minutes, and then to heating at 90°C for 10 minutes. No living cells are observed in the heated reaction mixture.

Neither germination nor death of spores was observed at the completion stage of the enzymatic treatment. It was confirmed that the spores of *Clostridium thermosaccharolyticum* were partially injured by the lysozyme treatment so as to reduce heat resistance, and the sterilization was consequently effected at 95°C.

The following non-limitative examples further illustrate the present invention.

Example 3

To potage soup was added Driselase (0.3% by weight) and the composition then well mixed. Samples of potage soup (each 100 g) were separately placed in pouches made of a metallized plastic film, and the pouches sealed in vaccuo. After standing for 30 minutes, at a temperature at 30°C samples were respectively heated at 120°C, 90°C and 70°C for 20 minutes by means of Autoclave.

The following table shows the number of cells which remained alive in the samples after enzymatic and heat treatments.

TABLE B

| Sample | Heating temperature after enzyme treatment | No addition of enzyme (cell/mil) | Number of Addition of Driselase (cell/mil.) |
|---|---|---|---|
| A | 120°C | 0 | 0 |
| B | 90°C | $1.4 \times 10^2$ | 0 |
| C | 70°C | $1.2 \times 10^6$ | $3.3 \times 10^4$ |

As shown in Table B, the sterilization of soup was effected at 120°C with or without the addition of enzyme. When the soup was not treated with enzyme, there were living cells therein after heating at a temperature below 90°C, and the soup putrefied during preservation at a room temperature for 2 or 3 days.

On the contrary, when the soup was treated with Driselase pursuant to the present invention (Sample B) and sterilized by heating at 90°C, it did not putrefy even after preserving for more than 6 months. Sample B heated at 90°C had better taste when compared with Sample A heated at 120°C.

Example 4

By using pork meat (8 kg.), beef meat (4 kg.) and mutton meat (1 kg.) sausages were prepared in a conventional manner by curing, mincing, kneading together stuffing into linked parts of an intestine, and smoking at 80°C for 40 minutes, boiling in a water for 20 minutes and then cooling.

In the kneading stage, an aqueous solution containing Driselase was added to the minced meats in the amount shown in the following table.

The sausages obtained were left standing by hanging in a container adjusted to a temperature of 30°C and a relative humidity of 90% for a period as shown in the following table, to determine the degree of putrefaction of the sausages.

| Amount of added enzyme* | | Standing period (day) | | | |
|---|---|---|---|---|---|
| | 1 | 2 | 3 | 4 | 5 |
| 0% (none) slime | − | + | ++ | +++ | ++++ |
| putrid smell | − | ± | ++ | +++ | ++++ |
| 0.5% slime | − | − | − | ± | + |
| putrid smell | − | − | − | − | + |
| 10% slime | − | − | − | − | ± |
| putrid smell | − | − | − | − | − |

Note* by weight based on meat
− none
+ exist

As is apparent from the above table, the addition of cellulase makes it possible to obtain sausages which can be stored for a long period of time, as compared with those to which cellulase has not been added.

As described above, according to the present invention, it is possible to completely sterilize foodstuffs and beverages contaminated with spore-bearing microorganisms at a lower temperature by germinating the spores or partially injuring the spores so as to reduce their heat resistance, and permit effective sterilization at low temperatures.

That which is sought to be protected is set forth in the following claims.

We claim:

1. A process for sterilizing foodstuffs and beverages containing spore-bearing microorganisms by use of relatively low temperatures for sterilization which comprises adding thereto an enzyme selected from the group consisting of (a) cellulase, and (b) lysozyme, for a treatment period, and then subjecting said foodstuff and beverage to relatively low temperature sterilization conditions.

2. The process of claim 1 wherein said cellulase in the form of an enzyme preparate further containing minor amounts of glucanase, xylanase, pectinase, dextranase, amylase and protease.

3. The process of claim 1 wherein a sterilization temperature of less than 100°C is used.

4. The process of claim 1 wherein said treatment is normally from 30 to 120 minutes at 35°C to 55°C with a pH of 3.5 to 8.0.

5. The process of claim 1 wherein said sterilization step is conducted at temperatures of 75°C to 95°C for 10 to 60 minutes.

* * * * *